United States Patent
Visser

(10) Patent No.: US 9,145,245 B1
(45) Date of Patent: Sep. 29, 2015

(54) LOTION SAVING DEVICE

(76) Inventor: Ronald Visser, Winnemucca, NV (US)

( * ) Notice: Subject to any disclaimer, the term of this patent is extended or adjusted under 35 U.S.C. 154(b) by 0 days.

(21) Appl. No.: 13/435,750

(22) Filed: Mar. 30, 2012

(51) Int. Cl.
*B65B 1/04* (2006.01)
*B65D 71/00* (2006.01)
*A47J 36/14* (2006.01)

(52) U.S. Cl.
CPC . *B65D 71/00* (2013.01); *A47J 36/14* (2013.01)

(58) Field of Classification Search
CPC ........................ B65D 71/502; B65D 81/3211
USPC ........................ 141/319, 331, 363–366, 368
See application file for complete search history.

(56) References Cited

U.S. PATENT DOCUMENTS

| | | | | |
|---|---|---|---|---|
| 3,217,917 A | * | 11/1965 | George | 215/386 |
| 3,266,533 A | * | 8/1966 | McHale | 141/364 |
| 3,615,150 A | * | 10/1971 | Indrunas | 141/375 |
| 3,877,499 A | * | 4/1975 | Fluster | 141/310 |
| 4,347,879 A | * | 9/1982 | Blaser | 141/364 |
| 4,598,822 A | * | 7/1986 | Hemmings | 206/379 |
| 4,625,780 A | | 12/1986 | Burnham | |
| 5,285,824 A | | 2/1994 | Krstovic | |
| 5,490,545 A | | 2/1996 | Sokoloff et al. | |
| 5,562,208 A | * | 10/1996 | Hasler et al. | 206/373 |
| 5,641,066 A | * | 6/1997 | Mascaro | 206/372 |
| 5,642,763 A | * | 7/1997 | Kurtz | 141/375 |
| 5,813,532 A | * | 9/1998 | Kheradpir et al. | 206/379 |
| 5,884,678 A | * | 3/1999 | Chudy | 141/319 |
| 5,951,385 A | * | 9/1999 | Newhouse et al. | 451/358 |
| 6,283,291 B1 | * | 9/2001 | Vasudeva et al. | 206/373 |
| 6,296,024 B1 | * | 10/2001 | Oestreich | 141/1 |
| 6,457,899 B1 | | 10/2002 | Lin | |
| D481,868 S | * | 11/2003 | Cunningham et al. | D3/273 |
| 6,745,802 B2 | * | 6/2004 | Varga | 141/319 |
| 7,347,459 B2 | * | 3/2008 | Geary et al. | 285/390 |
| D599,549 S | * | 9/2009 | Moss et al. | D3/282 |
| D600,014 S | * | 9/2009 | Moss et al. | D3/282 |
| 7,967,040 B1 | * | 6/2011 | Sanford | 141/319 |
| D645,338 S | * | 9/2011 | Kapur et al. | D9/415 |

* cited by examiner

*Primary Examiner* — Jason K Niesz
(74) *Attorney, Agent, or Firm* — Weiss & Moy, P.C.; Jeffrey D. Moy

(57) ABSTRACT

A lotion saving device that includes a plurality of hollow threaded members, each of said hollow threaded members having a first threaded portion and a second threaded portion, a plurality of first threads disposed interiorly upon the first threaded portion and a plurality of second threads disposed interiorly upon the second threaded portion, the plurality of second threads disposed enantiomorphically with respect to the plurality of first threads, wherein an extant first lotion container is rotatably attachable to the first threaded portion and an extant second lotion container is rotatably attachable to the second threaded portion, said first lotion container thereby elevated and inverted relative said second lotion container, whereby lotion drains from the first lotion container and is collectable in the second lotion container.

2 Claims, 4 Drawing Sheets

LOTION SAVING DEVICE

BACKGROUND OF THE INVENTION

Various types of lotion saving devices are known in the prior art. However, what is needed is a lotion saving device that includes a plurality of hollow threaded members, each of said hollow threaded members having a first threaded portion and a second threaded portion, a plurality of first threads disposed interiorly upon the first threaded portion and a plurality of second threads disposed interiorly upon the second threaded portion, the plurality of second threads disposed enantiomorphically with respect to the plurality of first threads, wherein an extant first lotion container is rotatably attachable to the first threaded portion and an extant second lotion container is rotatably attachable to the second threaded portion, said first lotion container thereby elevated and inverted relative said second lotion container, whereby lotion drains from the first lotion container and is collectable in the second lotion container.

FIELD OF THE INVENTION

The present invention relates to a lotion saving device, and more particularly, to a lotion saving device that includes a plurality of hollow threaded members, each of said hollow threaded members having a first threaded portion and a second threaded portion, a plurality of first threads disposed interiorly upon the first threaded portion and a plurality of second threads disposed interiorly upon the second threaded portion, the plurality of second threads disposed enantiomorphically with respect to the plurality of first threads, wherein an extant first lotion container is rotatably attachable to the first threaded portion and an extant second lotion container is rotatably attachable to the second threaded portion, said first lotion container thereby elevated and inverted relative said second lotion container, whereby lotion drains from the first lotion container and is collectable in the second lotion container.

SUMMARY OF THE INVENTION

The general purpose of the lotion saving device, described subsequently in greater detail, is to provide a lotion saving device which has many novel features that result in a lotion saving device which is not anticipated, rendered obvious, suggested, or even implied by prior art, either alone or in combination thereof.

Many people use lotion in the present day, to treat a plurality of epidermal concerns and abnormalities. Lotion is often expensive. Typically viscous, lotion often remains in a lotion container when said container is thrown away. The present lotion saving device has been configured to enable collection and retrieval of lotion from partially empty lotion containers to lessen waste and save money.

The instant lotion saving device includes a plurality of hollow threaded members rotatably attachable to the threaded neck of each of an extant pair of lotion containers. Each of the plurality of hollow threaded members is generally cylindrical and has a first open end and a second open end. A midpoint is disposed equidistantly between the first open end and the second open end. A first threaded portion is disposed between the first open end and the midpoint, and a second threaded portion is disposed between the midpoint and the second open end.

A plurality of first threads is disposed interiorly upon the first threaded portion, said plurality of first threads configured to rotatably engage with threads extant on the threaded neck of an extant first lotion container. A plurality of second threads is disposed upon the second threaded portion, said plurality of second threads configured to rotatably engage with threads extant on the threaded neck of an extant second lotion container. The plurality of second threads are disposed enantiomorphically with respect to the plurality of first threads, whereby said first and second lotion containers are attachable to the hollow threaded member simultaneously, when the threaded neck of each of said lotion containers is inserted into the respective first open end and the second open end, and the hollow threaded member is rotated in a single direction.

When the hollow threaded member is releasably attached to each of the first and second lotion containers, the threaded neck of the first lotion container is disposed overlying the threaded neck of the second lotion container whereby lotion is transferable between the first and second lotion containers. When the second lotion container is placed in an upright position, the first lotion container is thereby elevated and inverted, and lotion within the first lotion container is collectable within the second lotion container, said lotion draining into the second lotion container under the influence of gravity.

Each of the plurality of hollow threaded members is configured to have a particular thread count per inch, each of the plurality of hollow threaded members therefore useable with extant lotion containers having a threaded neck with a corresponding thread count per inch. Thusly, a plurality of extant lotion containers are useable with the instant device, each of the plurality of hollow threaded members attachable to a threaded neck of a lotion container having an equivalent thread count per inch.

A case is included to sanitarily store the plurality of hollow threaded members. The case includes a receiving tray configured to releasably receive each of the plurality of hollow threaded members. Indicia is disposed upon the receiving tray, each indicia disposed proximal a hollow threaded member with a corresponding thread count per inch. A lid is hingedly disposed upon the case, and the case is thereby closeable to sealingly enclose the plurality of hollow threaded members when not in use.

In the preferred embodiment herein disclosed, each of the plurality of hollow threaded members is approximately two inches long having a diameter of between approximately one-half an inch and one inch. Indicia is also disposed on each of the plurality of hollow threaded members whereby the thread count per inch of each of the plurality of hollow threaded members is readily discernible before use.

Thus has been broadly outlined the more important features of the present lotion saving device so that the detailed description thereof that follows may be better understood and in order that the present contribution to the art may be better appreciated.

Objects of the present lotion saving device, along with various novel features that characterize the invention are particularly pointed out in the claims forming a part of this disclosure. For better understanding of the lotion saving device, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 4 thereof, example of the instant lotion saving device employing the principles and concepts of the present lotion saving device and generally designated by the reference number 10 will be described.

Referring to FIGS. 1 through 4 a preferred embodiment of the present lotion saving device 10 is illustrated.

Many types of lotions are available on the market and in common use by people today to treat epidermal concerns and abnormalities, such as dryness, rashes, pimples and acne, psoriasis, eczema, and other epidermal concerns. Lotion is often viscous, and much lotion is wasted when a lotion container is deemed empty when, given time and an inverted situation, more lotion would be retrievable from said container. The present lotion saving device 10 has been devised to enable more lotion to be retrieved from a lotion container, and thus save money and resources. The present lotion saving device 10, therefore, is useable with partially empty lotion containers, as will be described forthwith, to more completely empty said partially empty lotion containers and collect lotion into a second such container (see below).

Figure 5:
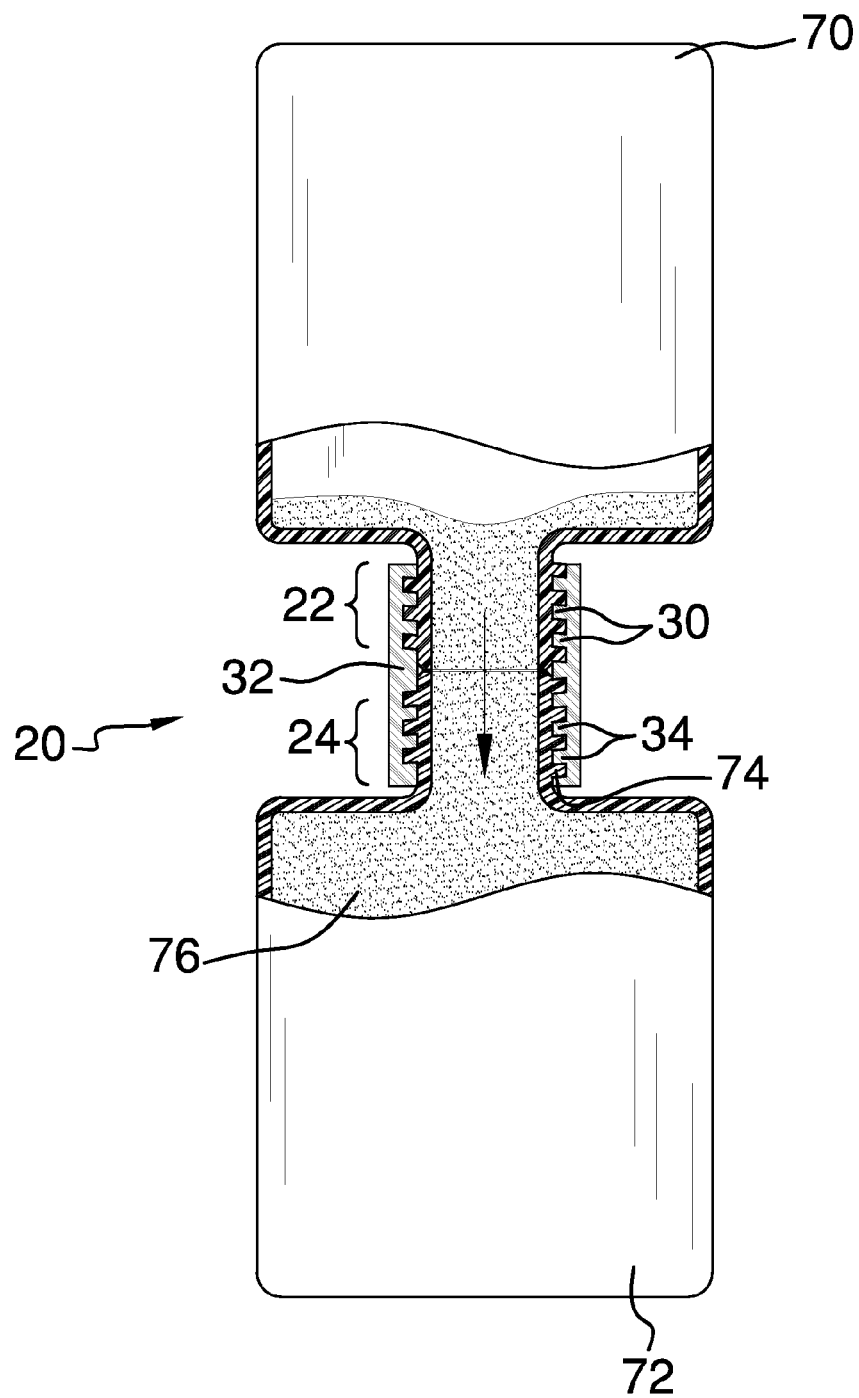
FIG. 5 is an in-use view with partial cutaway of a first lotion container and a second lotion container and a longitudinal cross-section of a hollow threaded member.

The present lotion saving device 10 interconnects an extant pair of lotion containers to collect lotion therefrom. The present lotion saving device 10 releasably interconnects an extant first lotion container 70 to an extant second lotion container 72 by releasably attaching to a threaded neck 74 of each of the first lotion container 70 and the second lotion container 72. Thusly, the instant lotion saving device 10 attaches to said first lotion container 70 and second lotion container 72, and when the second lotion container 72 is placed in an upright position, the first lotion container 70 is thereby elevated and inverted. Lotion 76 then drains from the first lotion container 70 into the second lotion container 72 by the action of gravity, and lotion 76 is collected and retrieved in the second lotion container 72 (see FIGS. 4 and 5).

The lotion saving device 10 includes a hollow threaded member 20 including a first threaded portion 22 and a second threaded portion 24. A first open end 26 is disposed endwise at the first threaded portion 22 and a second open end 28 is disposed endwise at the second threaded portion 24. A plurality of first threads 30 is disposed interiorly on the first threaded portion 22 between the first open end 26 and a midpoint 32 of the hollow threaded member 20. A plurality of second threads 34 is disposed interiorly on the second threaded portion 24, the plurality of second threads 34 disposed between the second open end 28 and the midpoint 32.

The plurality of second threads 34 is disposed enantiomorphically with respect to the plurality of first threads 30. The plurality of first threads 30 are configured to releasably engage with the threaded neck 74 of the first lotion container 70 and the plurality of second threads 34 are configured to releasably engage with the threaded neck 74 of the second lotion container 72. The plurality of second threads 34 is disposed enantiomorphically with respect to the plurality of first threads 30 and the hollow threaded member 20 is attachable to the threaded neck 74 of each of the first lotion container 70 and the second lotion container 72 at the same time, by turning the hollow threaded member 20 in a single direction after inserting the threaded neck 74 of each of the first lotion container 70 and the second lotion container 72 into the respective first open end 26 and the second open end 28.

The lotion saving device 10 includes a plurality of hollow threaded members 20 wherein each of the plurality of hollow threaded members 20 has a particular thread count per inch. Each of the plurality of hollow threaded members 20 is thereby useable with a particular lotion container having a threaded neck 74 with a corresponding thread count per inch. Each of the plurality of hollow threaded members 20 has an indicia 36 disposed thereupon and the thread count per inch of each of the plurality of threaded members 20 is thereby identifiable before use.

In the preferred embodiment herein disclosed, each of the hollow threaded members 20 is generally cylindrical in shape, approximately two inches long, and has a diameter of approximately between one-half an inch and one inch.

Figure 1:
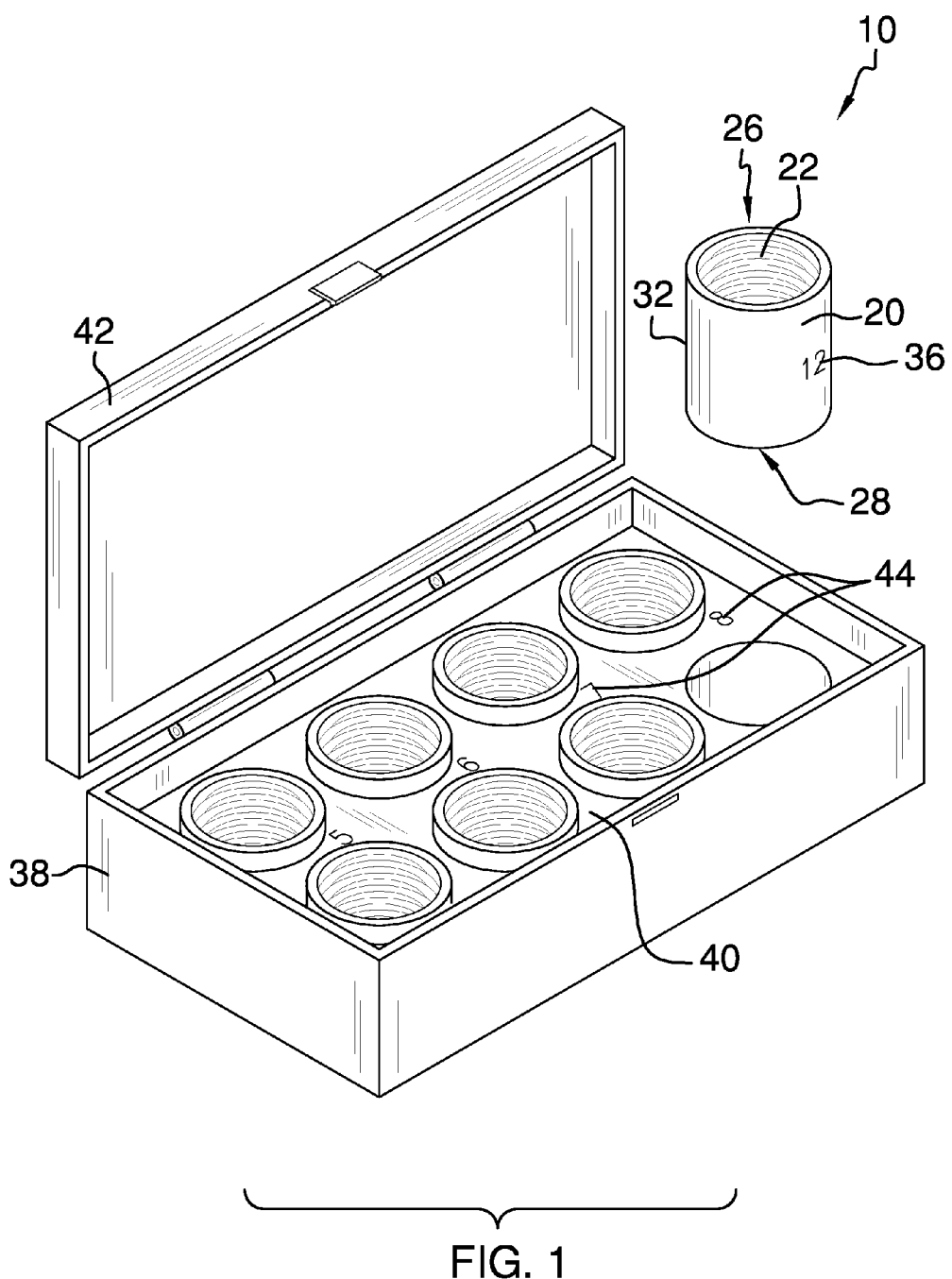
FIG. 1 is an isometric view.
Figure 2:
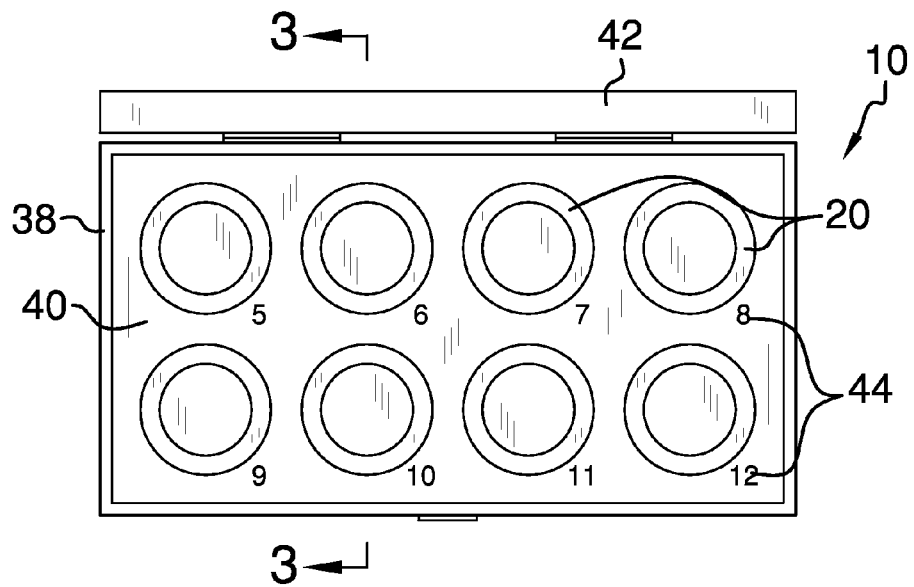
FIG. 2 is a top view.
Figure 3:
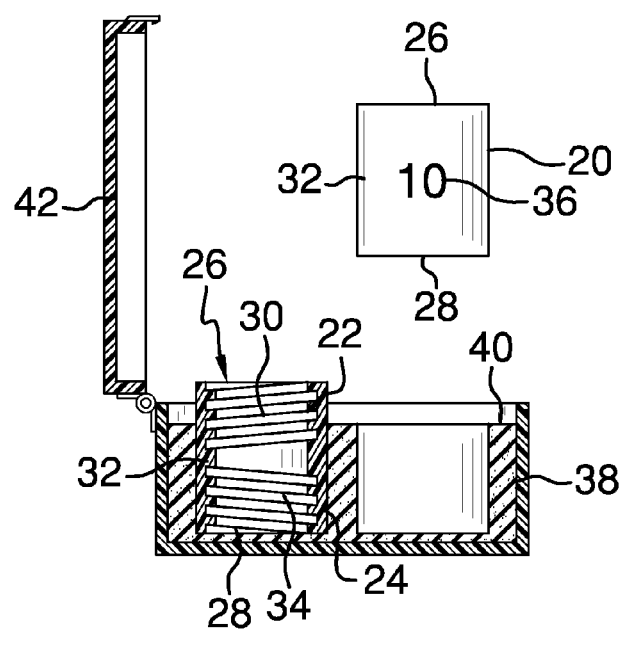
FIG. 3 is a cross-section view taken along the line 3-3 of FIG. 2.
Figure 4:
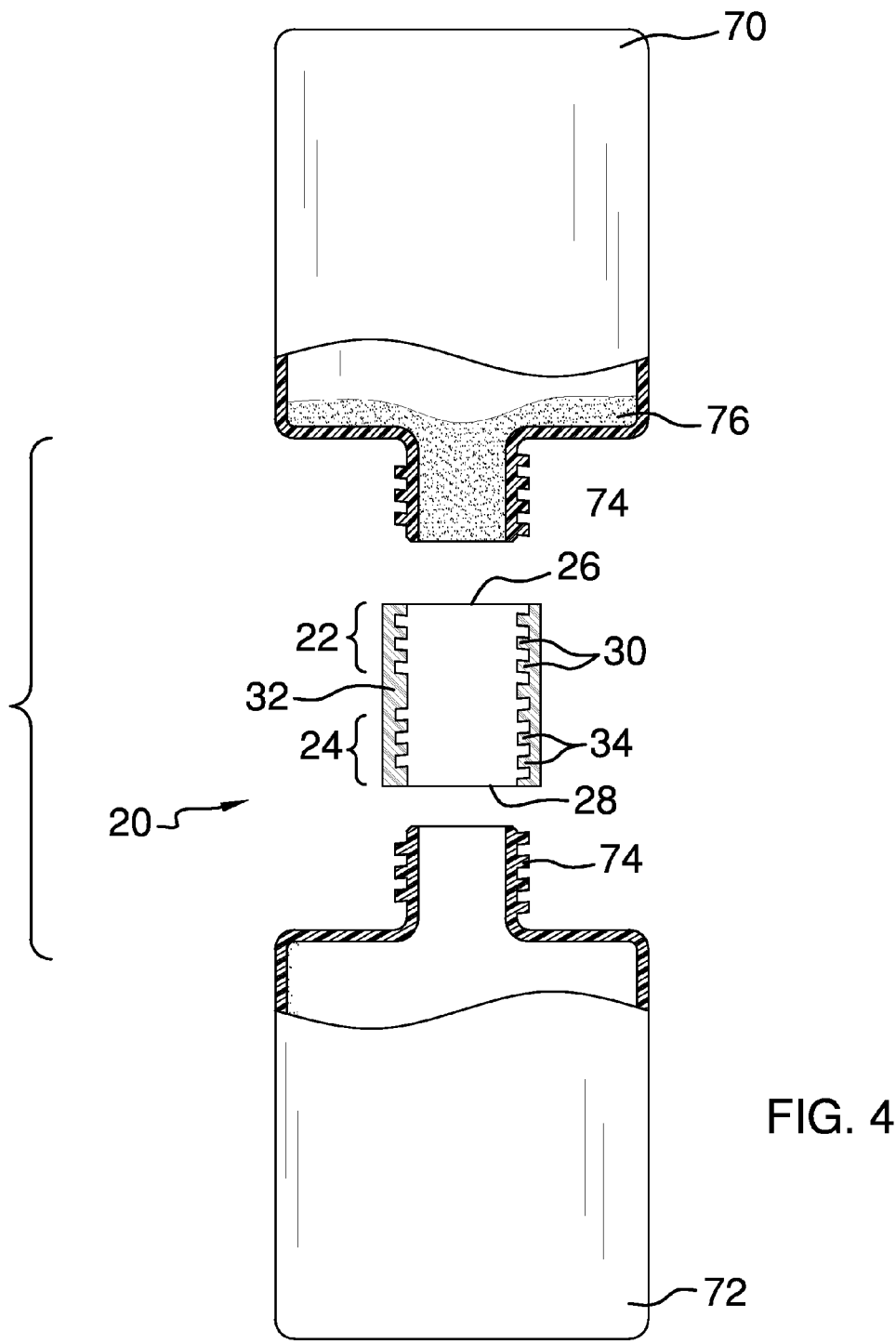
FIG. 4 is a side view with partial cutaway of a first lotion container and a second lotion container and a longitudinal cross-section of a hollow threaded member.

For storage of the plurality of threaded members 20 a case 38 is included (see FIGS. 1 and 2). The case 38 is configured to releasably receive each of the plurality of hollow threaded members 20, each of the plurality of hollow threaded members 20 insertible into a receiving tray 40 disposed within the case 38. The case 38 includes a lid 42 hingedly attached thereto, wherein the case 38 is closeable to sealingly enclose the plurality of threaded members 20 therein. Case indicia 44 is disposed upon the receiving tray 40 whereby each of the plurality of hollow threaded members 20 thread count per inch is identifiable proximal each of the plurality of hollow threaded end members 20 when each of the plurality of hollow threaded members 20 is disposed within the case 38 for storage.

What is claimed is:

1. A lotion saving device comprising:
a plurality of one-piece hollow cylinders, each of the plurality of one-piece hollow cylinders having a first open end and a second open end, each of the plurality of one-piece hollow cylinders having a uniform diameter along a length of each of the plurality of one-piece hollow cylinders, each of the plurality of one-piece having a first threaded portion and a second threaded portion;
a plurality of first threads disposed interiorly on the first threaded portion;
a plurality of second threads disposed interiorly on the second threaded portion, the plurality of second threads disposed enantiomorphically with respect to the plurality of first threads to allow simultaneous attachment of a first bottle to the plurality of first threads and a second bottle to the plurality of second threads by rotation of a corresponding one-piece hollow cylinder in a single direction;
a midpoint disposed equidistantly between the first open end and the second open end, the first threaded portion, the second threaded portion, and the midpoint having an identical interior diameter throughout the hollow cylinder;
a case for storing the plurality of one-piece hollow cylinders;
a receiving tray positioned within the case and configured to have each of the plurality of one-piece hollow cylinders insert into the receiving tray, each the plurality of one-piece hollow cylinders removable from the receiving tray;

a lid hingedly attached to the case, wherein the case is closeable to sealingly enclose the plurality of one-piece hollow cylinders therein; and cylinder indicia formed on each of the plurality of one-piece hollow cylinders indicating thread count per inch; and tray indicia located on the tray proximate each area on the tray where each of the one-piece hollow cylinders is inserted, the tray indicia indicating thread count per inch.

2. The lotion saving device of claim 1, wherein each of the plurality of one-piece hollow cylinders is approximately two inches long and has a diameter between one-half an inch and one inch.

\* \* \* \* \*